United States Patent
Han et al.

(10) Patent No.: US 8,026,982 B2
(45) Date of Patent: Sep. 27, 2011

(54) METHOD OF CONTROLLING POWER SUPPLY OF DIGITAL TV AND DIGITAL TV THEREFOR

(75) Inventors: Hee-chul Han, Seoul (KR); Se-huhn Hur, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1329 days.

(21) Appl. No.: 11/633,442

(22) Filed: Dec. 5, 2006

(65) Prior Publication Data
US 2007/0130609 A1 Jun. 7, 2007

(30) Foreign Application Priority Data
Dec. 5, 2005 (KR) .................. 10-2005-0117669

(51) Int. Cl.
*H04N 5/63* (2006.01)
(52) U.S. Cl. ......... 348/730; 348/552; 348/719; 348/734
(58) Field of Classification Search .................. 348/734, 348/730, 552, 714–721, 725; 725/37–38, 725/59, 131, 134, 133; *H04N 5/63*
See application file for complete search history.

(56) References Cited

U.S. PATENT DOCUMENTS

| 6,157,319 A | 12/2000 | Johns et al. |
| 6,285,406 B1* | 9/2001 | Brusky ........................ 348/552 |
| 6,898,763 B2* | 5/2005 | Hagiwara et al. ............. 715/716 |
| 7,050,049 B2* | 5/2006 | Byun ........................... 345/211 |
| RE41,482 E * | 8/2010 | Oh ............................... 348/730 |
| 2006/0117942 A1* | 6/2006 | Kim ............................ 91/433 |

FOREIGN PATENT DOCUMENTS

| CN | 2481092 Y | 3/2002 |
| EP | 1555772 A2 | 7/2005 |
| JP | 10-105271 A | 4/1998 |
| KR | 10-2005-0047607 A | 5/2005 |

* cited by examiner

*Primary Examiner* — Trang U Tran
(74) *Attorney, Agent, or Firm* — Sughrue Mion, PLLC

(57) ABSTRACT

A method of controlling a power supply of a digital TV with a function of executing applications is provided. According to the method, in a digital TV apparatus with the application executing function, a power supply of a general-purpose CPU platform which processes data required for executing an application and a power supply of a decoding unit which decodes digital broadcasting data and outputs the decoded data on a screen are controlled separately.

26 Claims, 5 Drawing Sheets

FIG. 1 (REALTED ART)
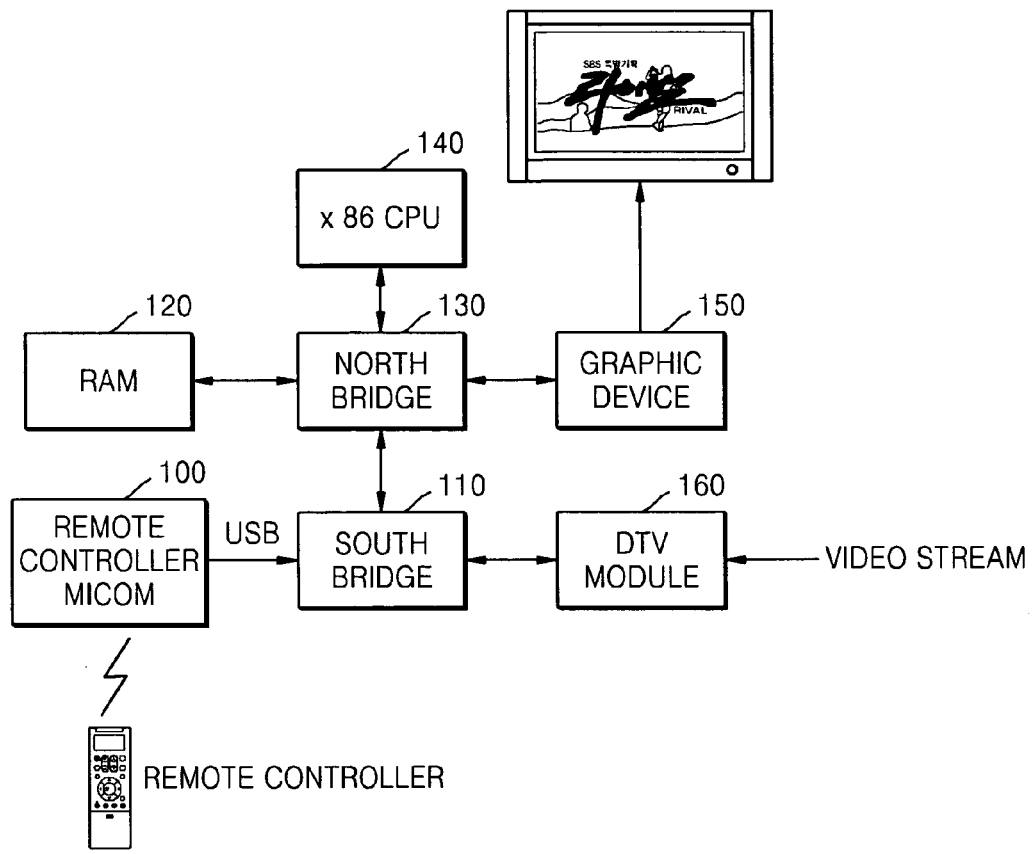
FIG. 2
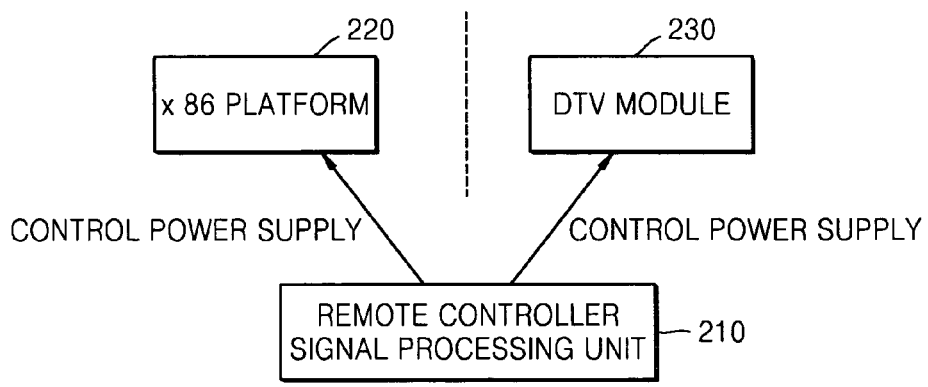

ated such that the quantity of heat generation of the digital TV increases and unnecessary power is consumed. In particular, when a general-purpose CPU, such as an x86, is employed, the problem becomes more serious.

METHOD OF CONTROLLING POWER SUPPLY OF DIGITAL TV AND DIGITAL TV THEREFOR

CROSS-REFERENCE TO RELATED PATENT APPLICATIONS

This application claims priority of Korean Patent Application No. 10-2005-0117669, filed on Dec. 5, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to a digital TV, and more particularly, to a method of controlling a power supply of a digital TV with a function of executing applications.

2. Description of the Related Art

As the convergence trend of digital consumer electronic appliances has been accelerated, a digital TV with which digital broadcasting can be watched has begun to process applications, such as games and Internet browsers, in order to provide a variety of services to users in addition to reception of broadcasting. Accordingly, the digital TV now requires a high-end CPU capable of processing more data. Since the capability of an ARM or an MIPS CPU that is a conventional embedded CPU is not enough to be used in a digital TV requiring a CPU with a 500 MHz or higher speed, a digital TV employing an x86 processor that is a general-purpose CPU instead of the embedded CPUs has been introduced.

FIG. 1 illustrates a structure of a related art x86 system;

As illustrated in FIG. 1, an x86 system can be split into two parts centering around a north bridge 130 and a south bridge 110, respectively. The north bridge 130 connects a CPU 140, a memory 120, and a PCI bus, and provides a high data rate. The south bridge 110 manages relatively slow data lines connecting peripheral devices, such as a hard disc data line, a USB bus, and an ISA bus, and can be connected to the CPU 140 through the north bridge 130.

If this system is applied to a digital TV, a DTV module 160 receives and decodes digital broadcasting data in an MPEG transport stream format, and the CPU 140 performs operations and graphic jobs required for execution of an application and stores related data in the memory 120. A graphic device 150 outputs broadcasting images and application graphics on the screen by overlaying the images and graphics. Meanwhile, a remote controller micom 100 receives a signal of a remote controller and performs channel change and screen adjustment requested by the user.

If this digital TV is used, the user can execute a variety of applications, for example, the user can enjoy a game or open a web browser while watching TV on the same screen. However, the user of this digital TV does not always execute an application while watching TV. Rather, in many cases, the user only watches TV most of time when the TV is turned on. However, though the user only watches TV, a CPU and other peripheral devices that do not relate to decoding and outputting of video images in the conventional digital TV still operate such that the quantity of heat generation of the digital TV increases and unnecessary power is consumed. In particular, when a general-purpose CPU, such as an x86, is employed, the problem becomes more serious.

SUMMARY OF THE INVENTION

The present invention provides a digital TV capable of setting a general-purpose CPU platform that is not used when only TV broadcasting is watched, to a power-saving mode, and a method therefor.

According to an aspect of the present invention, there is provided a digital TV apparatus having an application-execution function, the apparatus including: a general-purpose central processing unit (CPU) platform which processes data required for executing the application; a decoding unit which operates independently of the general-purpose CPU platform, decodes digital broadcasting data and outputs the decoded data on a screen; and a remote controller signal processing unit which controls a power supply of the general-purpose CPU platform and a power supply of the decoding unit, separately, according to a received remote controller signal.

If a remote controller signal to cut off the power supply of the TV is received after system booting of the general-purpose CPU platform is completed, the remote controller signal processing unit may control so that the power supply of the decoding unit is cut off and the general-purpose CPU maintains a state in which the system booting of the general-purpose CPU platform is completed and is set to a power-saving mode.

Also, if a remote controller signal to display only the screen of the digital TV without executing an application is received after system booting of the general-purpose CPU platform is completed, the remote controller signal processing unit may control so that the general-purpose CPU maintains a state in which the system booting of the general-purpose CPU platform is completed and is set to a power-saving mode.

Meanwhile, when the general-purpose CPU platform operates at a normal mode, the decoding unit may output the decoded data on the screen through a video processor of the general-purpose CPU platform, and when the general-purpose CPU platform operates at a power-saving mode, the decoding unit may output the decoded data on the screen through a display port. The dedicated display port may be a video interface port (VIP).

According to another aspect of the present invention, there is provided a method of controlling a power supply of a digital TV apparatus having an application execution function, the method including: performing system booting of a general-purpose CPU platform executing an application when a TV power supply is turned on; and controlling a power supply of a decoding unit which receives a digital broadcasting signal and outputs a video signal on a screen, and a power supply of the general-purpose CPU platform, separately, according to a received remote controller signal.

The decoding unit and the general-purpose CPU platform may operate independently from each other.

Here, in the controlling of the power supply of the decoding unit and the power supply of the general-purpose CPU platform, if a remote controller signal to display only the screen of the digital TV without executing an application is received after system booting of the general-purpose CPU platform is completed, the general-purpose CPU may maintain a state in which the system booting of the general-purpose CPU platform is completed and is set to a power-saving mode.

According to still another aspect of the present invention, there is provided a computer readable recording medium having embodied thereon a computer program for executing the method of controlling a power supply of a digital TV with an application executing function.

BRIEF DESCRIPTION OF THE DRAWINGS

The above and other features and aspects of the present invention will become more apparent by describing in detail exemplary embodiments thereof with reference to the attached drawings in which:

FIG. 1 illustrates a structure of a related art x86 system;

FIG. 2 is a block diagram explaining an operation of a digital TV according to an exemplary embodiment of the present invention;

DETAILED DESCRIPTION OF THE INVENTION

The present invention will now be described more fully with reference to the accompanying drawings, in which exemplary embodiments of the invention are shown.

FIG. 2 is a block diagram explaining an operation of a digital TV according to an exemplary embodiment of the present invention. In FIG. 2, an x86 platform 220 indicates an x86 device and peripheral devices required to execute applications, such as a graphic processor. Also, as described above, a DTV module 230 independently receives digital broadcasting data in an MPEG transport stream format, decodes the stream and outputs a video signal. A remote controller signal processing unit 210 receives a remote controller signal generated when a user manipulates a remote controller, and performs a variety of jobs, including execution of an application, changing a broadcasting reception channel, and adjustment of volume. Meanwhile, the compression format of the digital broadcasting data is not limited to the MPEG format, and this will be the same in the following description.

As illustrated in FIG. 2, in the digital TV according to the present exemplary embodiment, the x86 platform 220 and the DTV module 230 are implemented on different boards and operate with separate power supplies. That is, the remote controller signal processing unit 210 controls the power supply of the x86 platform 220 and the power supply of the DTV module, separately, according to the remote controller signal by the user's manipulation. According to this structure, when the user only watches TV without executing an application, the power supply of the x86 platform 220 is cut off or operates in a power-saving mode such that unnecessary consumption of power can be prevented.

Figure 3:
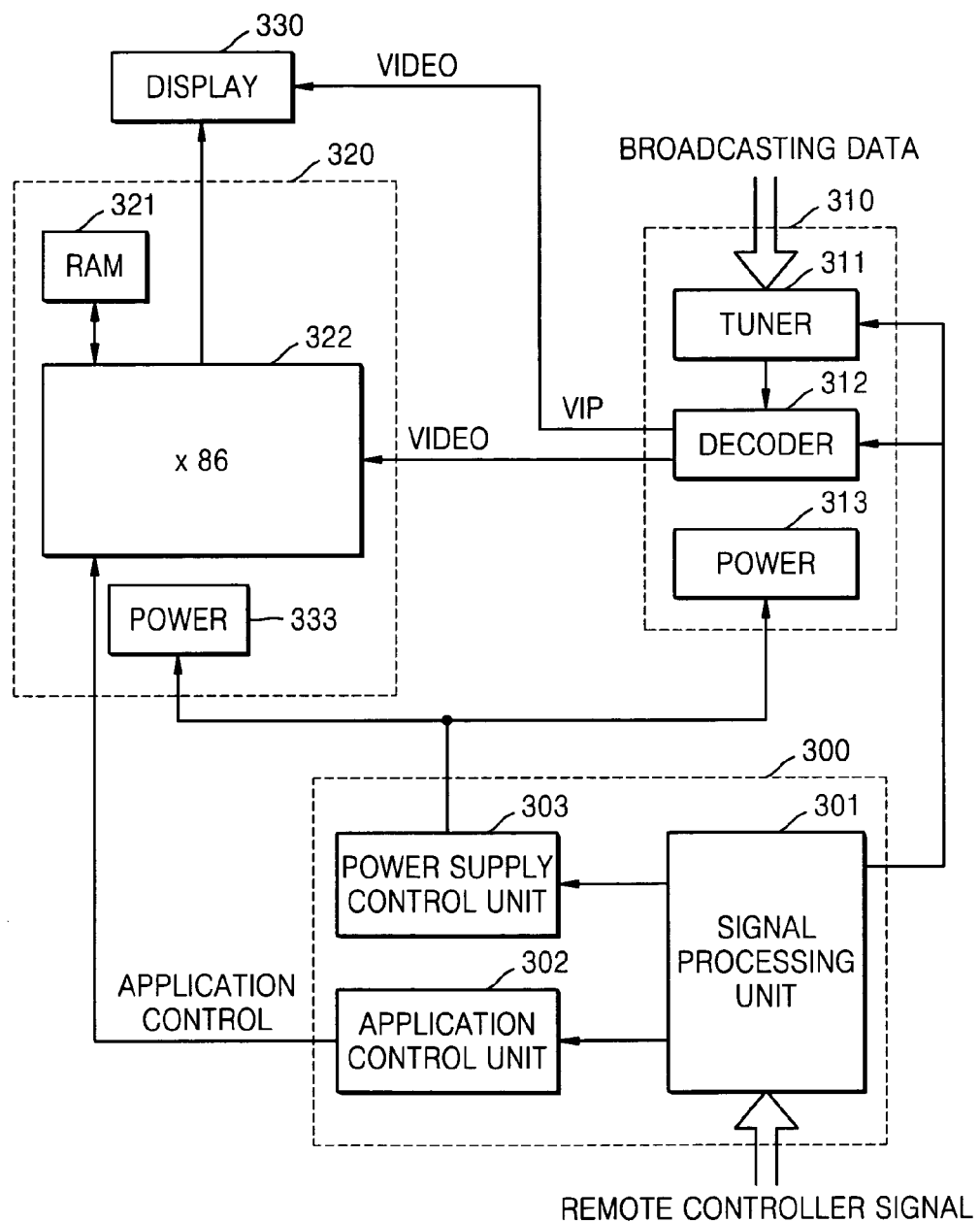
FIG. 3 is a block diagram of a structure of a digital TV according to an exemplary embodiment of the present invention.

FIG. 3 is a block diagram of a structure of a digital TV according to an exemplary embodiment of the present invention.

As already described above, an x86 platform 320 executes an application and a DTV module 310 independently receives digital broadcasting data and outputs a decoded video signal. A remote controller signal processing unit 300 controls the power supplies of the x86 platform 320 and the DTV module 310 as well as execution of an application or adjustment of a channel, according to signal received from a remote controller.

The remote controller signal processing unit 300 is composed of a signal processing unit 301, an application control unit 302 and a power supply control unit 303. The signal processing unit 301 receives and interprets a remote controller signal and generates a required request signal. The application control unit 302 requests a job to the x86 platform 320 if the received remote controller signal relates to control of an application. The power supply control unit 303 controls the power supplies of the x86 platform 320 and the DTV module 310. The DTV module 310 is composed of a tuner 311 changing a received channel, a decoder 312 decoding a received transport stream and a power supply adjustment unit 313.

A video signal output from the decoder 312 is input to the x86 platform 320. In the x86 platform 320, the video signal is overlaid with an application graphic generated by an x86 CPU 322, and is output to a display apparatus 330. The video signal may be overlaid in the DTV module 310 and output to the display apparatus 330. However, since the graphic processing performance of the x86 platform 320 is superior to that of the DTV module 310 generally, the video signal is overlaid in the x86 platform 320.

If the user wants to only watch TV by terminating execution of an application using a remote controller, the power supply control unit 303 cuts off the power supply of the x86 platform 320 by manipulating a power supply adjustment unit 333 of the x86 platform 320. When the power supply of the x86 platform 320 is cut off, the decoder 312 outputs a video signal to the display apparatus 330 through a route not including the x86 platform 320. At this time, other interfaces, such as a video interface port (VIP), can be used.

Meanwhile, depending on the power consumption of the x86 platform 320, even when the user only watches TV, the power supply of the x86 platform 320 may be set to a power-saving mode without being cut off so that the x86 platform 320 can wait for a next job. In an architecture based on a general-purpose CPU, such as an x86, no jobs can be performed before booting of a system, which includes performing of many operations, such as execution of a BIOS program, and loading of an operating system and device drivers, is completed. Accordingly, when the power supply of the x86 platform is cut off, if the user wants to again execute an application, the user has to wait inconveniently until the booting of the system is completed.

Figure 4:
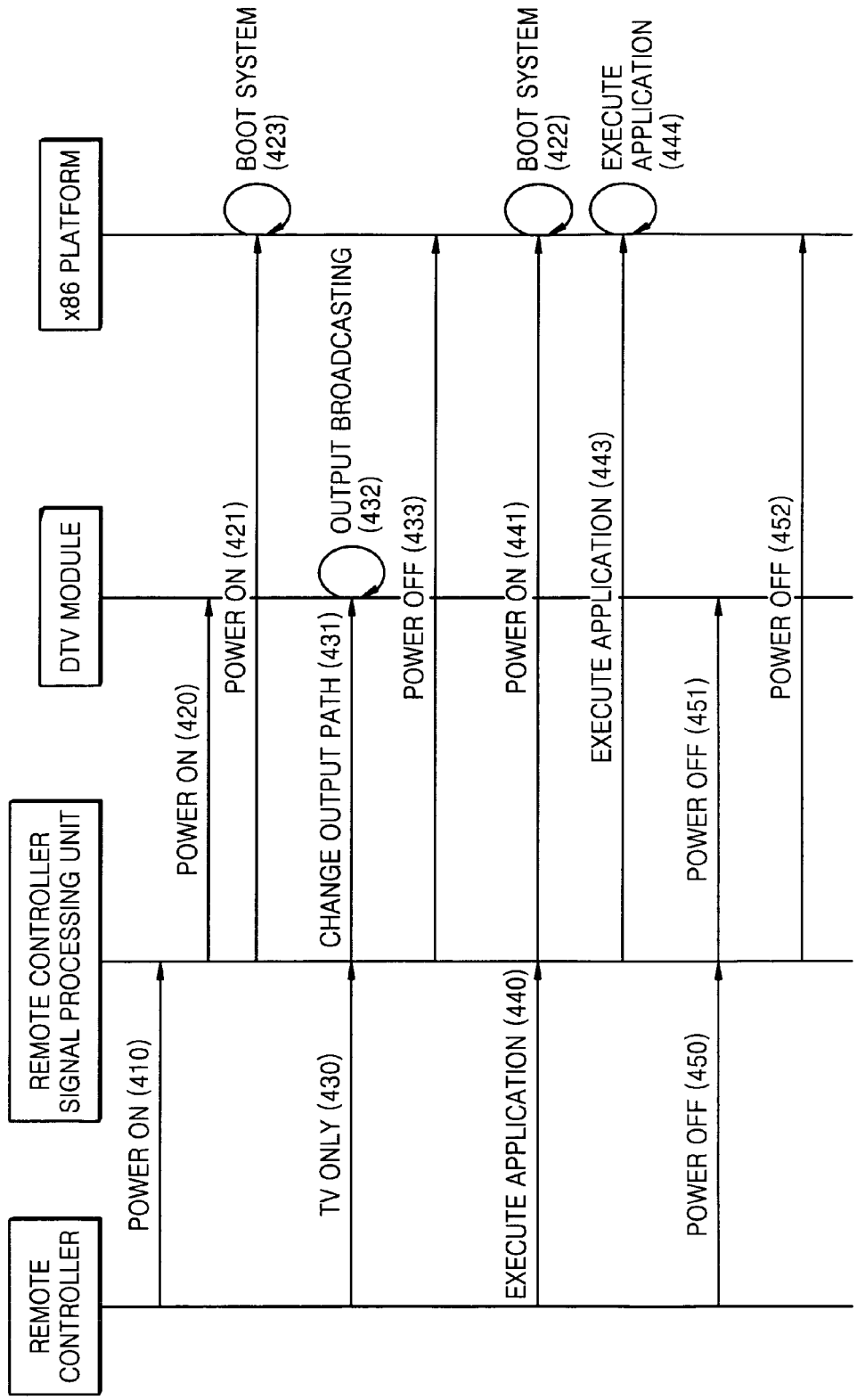
FIG. 4 is a flowchart of a process of controlling a power supply of a digital TV according to an exemplary embodiment of the present invention.

FIG. 4 is a flowchart of a process of controlling a power supply of a digital TV according to an exemplary embodiment of the present invention.

When the power supply of a TV is turned off, if the user turns on the power supply of the TV by manipulating a remote controller in operation 410, a remote controller signal processing unit turns on the power supplies of a DTV module and an x86 platform, respectively, through a power supply adjustment unit in operations 420 and 421. If the power supply is turned on in the x86 platform, a BIOS program is executed and an operating system and device drivers are loaded. By doing so, a system booting is performed in operation 423.

Then, if the user transmits a remote controller signal to terminate an application and only watches TV in operation 430, the remote controller signal processing unit transmits a signal to the DTV module requesting that broadcasting of a corresponding channel be output through a VIP in operation 431 and the power supply of the x86 platform is cut off in operation 433.

While the user watches TV, if the user presses a remote controller button to execute an arbitrary application, such as a web browser, and transmits a signal in operation 440, the remote controller signal processing unit receiving this signal first turns on the power supply of the x86 platform in operation 441. If the booting of the system of the x86 platform is completed in operation 442, execution of the corresponding application is requested again in operation 443 and the x86 platform executes the application in operation 444.

If the user presses a power-supply-off button of the remote controller, the remote controller signal processing unit cuts off all power supplies of both the DTV module and the x86 platform in operations 451 and 452.

In the present exemplary embodiment, if an application is not executed, the power supply of the x86 platform is cut off. This structure may be useful when power consumed in the x86 platform is very high, but if an application is desired to be executed again, the user has to wait inconveniently until the booting of the x86 platform is completed. An exemplary embodiment in which when an application is desired to be executed again, the power supply of the x86 platform is set to a power-saving mode without being cut off will now be explained.

Figure 5:
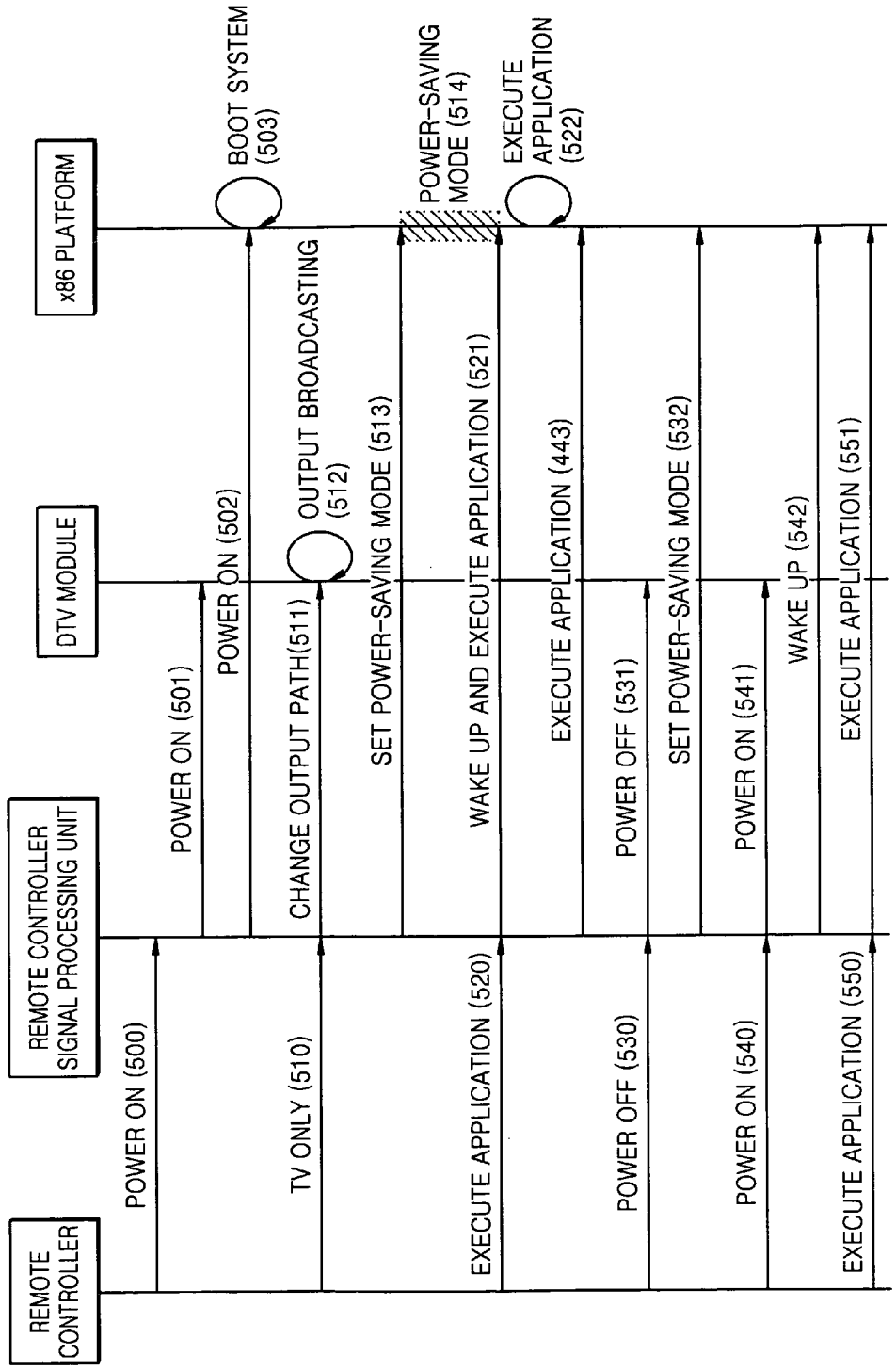
FIG. 5 is a flowchart of a process of controlling a power supply of a digital TV according to another exemplary embodiment of the present invention.

FIG. 5 is a flowchart of a process of controlling a power supply of a digital TV according to another exemplary embodiment of the present invention.

As in the exemplary embodiment described above with reference to FIG. 4, when the power supply of a TV is turned off, if the user turns on the power supply of the TV by manipulating a remote controller in operation 500, a remote controller signal processing unit turns on the power supplies of a DTV module and an x86 platform, respectively, through a power supply adjustment unit in operations 501 and 502. If the power supply is turned on in the x86 platform, a BIOS program is executed and an operating system and device drivers are loaded. By doing so, a system booting is performed in operation 503.

Then, if the user transmits a remote controller signal to terminate an application and only watches TV in operation 430, the remote controller signal processing unit transmits a signal to the DTV module requesting that broadcasting of a corresponding channel be output through a VIP in operation 511 and the power supply of the x86 platform is set to a power-saving mode in operation 513. That is, though the x86 platform is not currently executing an application or processing a signal, the x86 platform maintains a state in which the booting of the system is completed, and the x86 system is operated by a power less than that for a normal operation in operation 522.

If the user presses a remote controller button to execute an arbitrary application and transmits a signal in operation 520, the remote controller signal processing unit receiving this signal transmits a wake-up signal to switch from a power-saving mode to a normal mode and a signal requesting the x86 platform to execute a corresponding application, to the x86 platform. The x86 platform receiving the wake-up signal and the signal requesting to execute the corresponding application finishes the power-saving mode and executes the corresponding application in operation 522.

If the user presses a power-supply-off button of the remote controller, the remote controller signal processing unit cuts of the power supply of the DTV module and sets the x86 platform to a power-saving mode in operation 532. Also in this case, when the user presses a power-supply-on button of the TV again, the remote controller signal processing unit transmits a wake-up signal to the x86 platform in operation 542, and accordingly, without a need to wait for a system booting process, the user can immediately request execution of an application in operation 550. However, depending on implementations, the user may personally select one of cutting off of the power supply of the x86 platform and setting of a power-saving mode, and manually set the power supply mode of the x86 platform.

Figure 6:
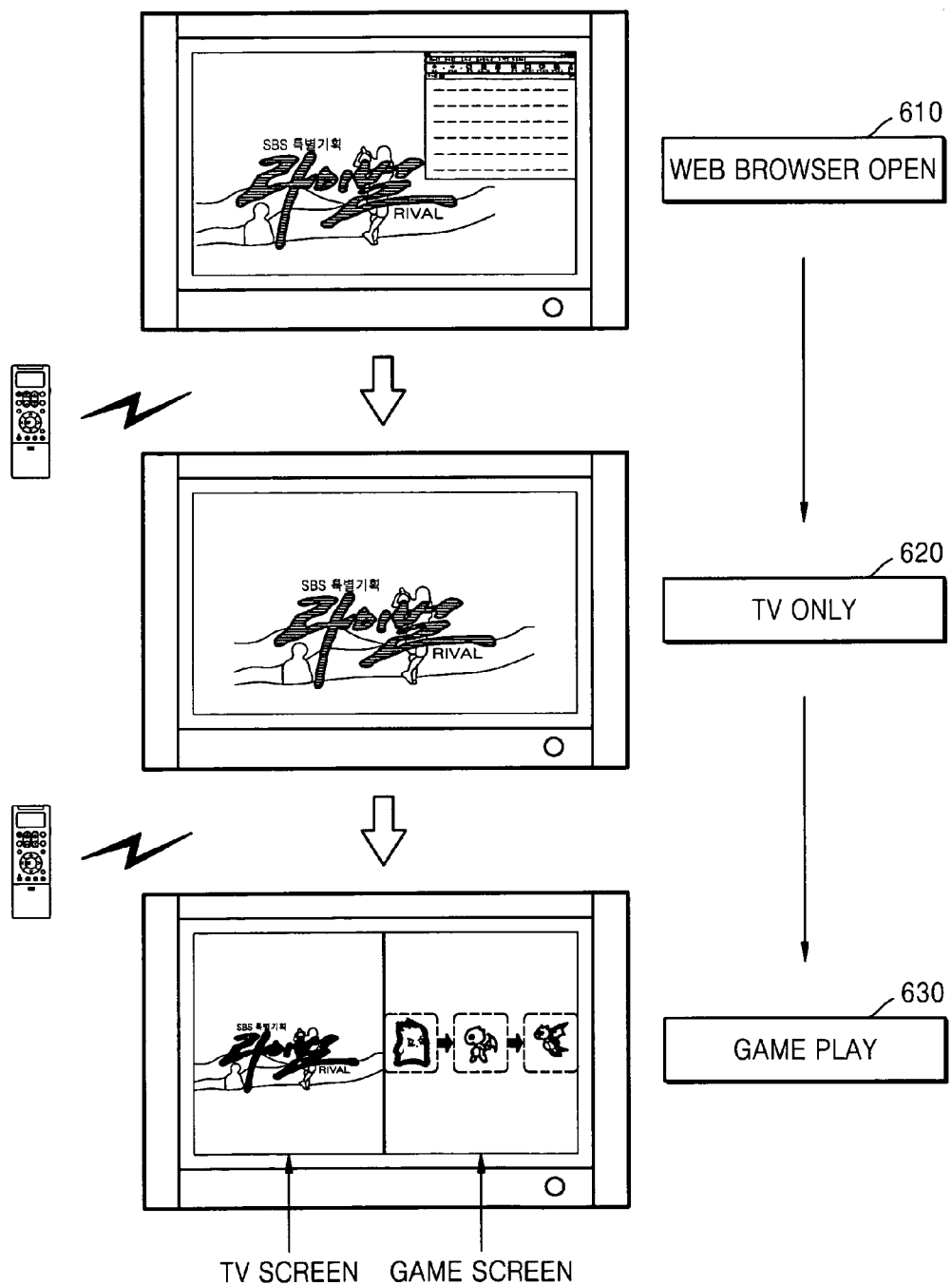
FIG. 6 illustrates structures of the screen of a digital TV according to an exemplary embodiment of the present invention.

FIG. 6 illustrates structures of the screen of a digital TV according to an exemplary embodiment of the present invention.

The TV at the top shows a screen in which a TV screen is set as a background screen and a web browser is executed in a small window. At this time, the DTV module and the x86 platform operate at a normal power supply mode, and a video signal output from the DTV module is overlaid with a web browser graphic through the x86 platform.

The second TV shows a screen when the user terminates an application and only watches TV. At this time, only the DTV module is operating and a video signal is output through a VIP. Meanwhile, the power supply of the x86 platform may be cut off or set to a power-saving mode.

The TV at the bottom shows a screen when the user executes a game application while watching TV. If the power supply of the x86 platform is cut off in the second TV screen, the user has to wait until the system booting of the x86 platform is completed in order to get the TV screen at the bottom. If the power supply of the x86 platform is set to a power-saving mode in the second TV screen, the user can immediately execute the game application without the system booting process as described above.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

According to an aspect of the present invention, when only a TV function is used without executing an application in a digital TV having an application-execution function, the power supply of a general-purpose CPU platform to execute an application can be cut off or set to a power-saving mode such that unnecessary power consumption is prevented and the quantity of heat generation of the TV can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A digital TV apparatus having an application-execution function, the apparatus comprising:
   a general-purpose central processing unit (CPU) platform which processes data required for executing an application;
   a decoding unit which operates independently of the general-purpose CPU platform, decodes digital broadcasting data, and outputs the decoded data on a screen; and
   a remote controller signal processing unit which controls a power supply of the general-purpose CPU platform and a power supply of the decoding unit, separately, according to a received remote controller signal, wherein when the general-purpose CPU platform operates at a normal mode, the decoding unit outputs the decoded data on the screen through a video processor of the general-purpose CPU platform, and when the general-purpose CPU platform operates at a power-saving mode, the decoding unit outputs the decoded data on the screen through a display port.

2. The apparatus of claim 1, wherein if a remote controller signal to cut off the power supply of the digital TV is received after system booting of the general-purpose CPU platform is completed, the remote controller signal processing unit controls so that the power supply of the decoding unit is cut off and the general-purpose CPU maintains a state in which the system booting of the general-purpose CPU platform is completed and is set to a power-saving mode.

3. The apparatus of claim 1, wherein if a remote controller signal to display only the screen of the digital TV without executing an application is received after system booting of the general-purpose CPU platform is completed, the remote controller signal processing unit controls so that the general-purpose CPU maintains a state in which the system booting of the general-purpose CPU platform is completed and is set to a power-saving mode.

4. The apparatus of claim 1, wherein the display port is a video interface port (VIP).

5. The apparatus of claim 1, wherein if a remote controller signal to change a channel is received, the remote controller signal processing unit directly controls the decoding unit without passing through the general-purpose CPU to change the channel.

6. The apparatus of claim 1, wherein the general-purpose CPU is an x86 processor.

7. The apparatus of claim 1, wherein if a remote controller signal to display only the screen of the digital TV without executing an application is received after system booting of the general-purpose CPU platform is completed, the remote controller signal processing unit controls so that the power supply of the general-purpose CPU is cut off.

8. The apparatus of claim 1, wherein when the general-purpose CPU platform operates at a normal mode, the decoding unit outputs the decoded data on the screen through a video processor of the general-purpose CPU platform, and when the power supply of the general-purpose CPU is cut off, the decoding unit outputs the decoded data on the screen through a display port.

9. The apparatus of claim 1, wherein when a remote controller signal is received after system booting of the general-purpose CPU platform is completed, the remote controller signal processing unit selects one of cutting off the power supply of the general-purpose CPU platform, setting the power supply of the general-purpose CPU platform in a power-saving mode and maintaining the general-purpose CPU in a state in which the system booting of the general-purpose CPU platform is completed, and operating the power supply of the general-purpose CPU platform at a normal mode, according to a user's selection corresponding to the received remote controller signal.

10. The apparatus of claim 1, wherein a user overwrites the controlling of the power supply of the general-purpose CPU by manually selecting one of cutting off the power supply of the general-purpose CPU platform, setting the power supply of the general-purpose CPU platform in a power-saving mode and maintaining the general-purpose CPU in a state in which a system booting of the general-purpose CPU platform is completed, and operating the power supply of the general-purpose CPU platform at a normal mode.

11. A method of controlling a power supply of a digital TV apparatus having an application-execution function, the method comprising:

performing system booting of a general-purpose CPU platform which executes an application when a TV power supply is turned on;

controlling a power supply of a decoding unit which receives a digital broadcasting signal and outputs a video signal on a screen, and a power supply of the general-purpose CPU platform, separately, according to a received remote controller signal; and outputting the video signal on the screen according to the mode of the power supply of the general-purpose CPU platform, wherein when the general-purpose CPU platform operates at a normal mode, the video signal is output on the screen through a video processor of the general-purpose CPU platform, and when the general-purpose CPU platform operates at a power-saving mode, the video signal is output on the screen through a display port.

12. The method of claim 11, wherein in the controlling of the power supply of the decoding unit and the power supply of the general-purpose CPU platform, if a remote controller signal to cut off the power supply of the TV is received after system booting of the general-purpose CPU platform is completed, the power supply of the decoding unit is cut off and the general-purpose CPU maintains a state in which the system booting of the general-purpose CPU platform is completed and is set to a power-saving mode.

13. The method of claim 11, wherein in the controlling of the power supply of the decoding unit and the power supply of the general-purpose CPU platform, if a remote controller signal to display only the screen of the digital TV without executing an application is received after system booting of the general-purpose CPU platform is completed, the general-purpose CPU maintains a state in which the system booting of the general-purpose CPU platform is completed and is set to a power-saving mode.

14. The method of claim 11, wherein the dedicated display port is a video interface port (VIP).

15. The method of claim 11, wherein the general-purpose CPU is an x86 processor.

16. The method of claim 11, wherein in the controlling of a power supply of the decoding unit and the power supply of the general-purpose CPU platform, if a remote controller signal to display only the screen of the digital TV without executing an application is received after system booting of the general-purpose CPU platform is completed, the power supply of the general-purpose CPU is cut off.

17. The method of claim 11, further comprising outputting the video signal on the screen according to the mode of the power supply of the general-purpose CPU platform, wherein when the general-purpose CPU platform operates at a normal mode, the video signal is output on the screen through a video processor of the general-purpose CPU platform, and when the power supply of the general-purpose CPU platform is cut off, the video signal is output on the screen through a display port.

18. The method of claim 11, wherein the controlling of the power supply of the general-purpose CPU platform comprises selecting one of cutting off the power supply of the general-purpose CPU platform, setting the power supply of the general-purpose CPU platform in a power-saving mode and maintaining the general-purpose CPU in a state in which the system booting of the general-purpose CPU platform is completed, and operating the power supply of the general-purpose CPU platform at a normal mode, according to a user's selection corresponding to the received remote controller signal.

19. The method of claim 11, wherein a user overwrites the controlling the power supply of the general-purpose CPU by manually selecting one of cutting off the power supply of the general-purpose CPU platform, setting the power supply of the general-purpose CPU platform in a power-saving mode and maintaining the general-purpose CPU in a state in which the system booting of the general-purpose CPU platform is completed, and operating the power supply of the general-purpose CPU platform at a normal mode.

20. A non-transitory computer readable recording medium storing a computer program which when executed by a computer, performs the method of claim 11.

21. A non-transitory computer readable recording medium storing a computer program which when executed by a computer, performs the method of claim 12.

22. A non-transitory computer readable recording medium storing a computer program which when executed by a computer, performs the method of claim 13.

23. A non-transitory computer readable recording medium storing a computer program which when executed by a computer, performs the method of claim 16.

24. A non-transitory computer readable recording medium storing a computer program which when executed by a computer performs the method of claim 17.

25. A non-transitory computer readable recording medium storing a computer program which when executed by a computer, performs the method of claim 18.

26. A non-transitory computer readable recording medium storing a computer program which when executed by a computer, performs the method of claim 19.

* * * * *